US012671821B2

(12) United States Patent
Zhao et al.

(10) Patent No.: US 12,671,821 B2
(45) Date of Patent: Jun. 30, 2026

(54) SYSTEMS AND METHODS FOR ADAPTIVE EXTRAPOLATION FILTER BASED INTRA PREDICTION MODE

(71) Applicant: Tencent America LLC, Palo Alto, CA (US)

(72) Inventors: Xin Zhao, Palo Alto, CA (US); Xiaozhong Xu, Palo Alto, CA (US); Biao Wang, Palo Alto, CA (US); Lien-Fei Chen, Palo Alto, CA (US); Roman Chernyak, Palo Alto, CA (US); Madhu Peringassery Krishnan, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 50 days.

(21) Appl. No.: 18/641,215

(22) Filed: Apr. 19, 2024

(65) Prior Publication Data

US 2024/0357128 A1      Oct. 24, 2024

Related U.S. Application Data

(60) Provisional application No. 63/461,547, filed on Apr. 24, 2023.

(51) Int. Cl.
*H04N 19/159* (2014.01)
*H04N 19/176* (2014.01)
(52) U.S. Cl.
CPC ......... *H04N 19/159* (2014.11); *H04N 19/176* (2014.11)

(58) Field of Classification Search
CPC ........................... H04N 19/159; H04N 19/176
See application file for complete search history.

(56) References Cited

U.S. PATENT DOCUMENTS

| | | | |
|---|---|---|---|
| 9,380,298 B1 * | 6/2016 | Gu ......................... | H04N 19/14 |
| 2020/0169749 A1 * | 5/2020 | Hsu ...................... | H04N 19/625 |

(Continued)

OTHER PUBLICATIONS

Luhang Xu et al., "Non-EE2: An Extrapolation Filter-Based Intra Prediction Mode", Document: JVET-AD0081-v3, Joint Video Experts Team (JVET) of ITU-T SG 16 WP 3 and ISO/IEC JTC 1/SC 29, 30th Meeting: Antalya, TR, Apr. 21-28, 2023, 4 pgs.

(Continued)

*Primary Examiner* — Irfan Habib
(74) *Attorney, Agent, or Firm* — ARENTFOX SCHIFF LLP

(57)          ABSTRACT

An example method of video coding includes receiving a video bitstream for a plurality of blocks. When an extrapolation filter-based intra prediction (EIP) mode is active for a current block of the plurality of blocks, the method also includes determining, when a boundary condition is met for the current block, one or more EIP mode parameters from a first set of EIP parameters. When the boundary condition is not met for the current block, the method also includes determining the one or more EIP mode parameters from a second set of EIP parameters, where the second set of EIP parameters includes one or more parameters not included in the first set of EIP parameters. The method further includes reconstructing the current block using the one or more EIP mode parameters.

20 Claims, 7 Drawing Sheets

(56) References Cited

U.S. PATENT DOCUMENTS

| | | | |
|---|---|---|---|
| 2020/0204802 A1 | 6/2020 | Kanoh et al. | |
| 2020/0244802 A1* | 7/2020 | Klimczak | H04M 1/2475 |
| 2020/0382773 A1* | 12/2020 | Bokov | H04N 19/184 |
| 2024/0064310 A1* | 2/2024 | Salehifar | H04N 19/11 |
| 2024/0314303 A1* | 9/2024 | Ma | H04N 19/11 |
| 2025/0142101 A1* | 5/2025 | Cho | H04N 19/186 |
| 2025/0392712 A1* | 12/2025 | Xu | H04N 19/117 |

OTHER PUBLICATIONS

Muhammed Coban et al., "Algorithm Description of Enhanced Compression Model 8 (ECM 8)", Document: JVET-AC2025, Joint Video Experts Team (JVET) of ITU-T SG 16 WP 3 and ISO/IEC JTC 1/SC 29, 29th Meeting: by Teleconference, Jan. 11-20, 2023, 77 pgs.
International Search Report and Written Opinion received for PCT Patent Application No. PCT/US2024/025714, mailed on Aug. 1, 2024, 8 pages.

\* cited by examiner

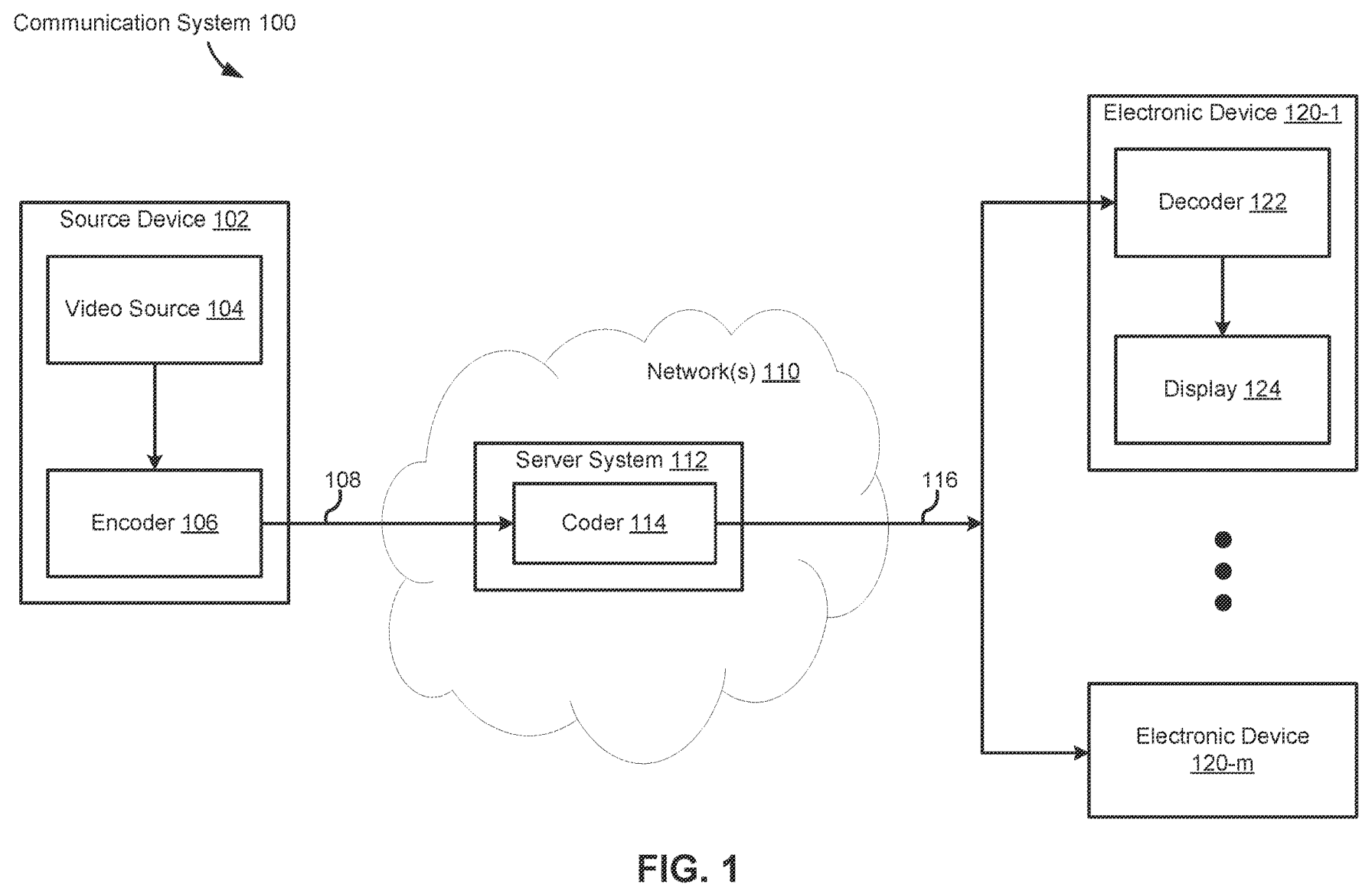

Communication System 100

Source Device 102

Video Source 104

Encoder 106

108

Network(s) 110

Server System 112

Coder 114

116

Electronic Device 120-1

Decoder 122

Display 124

Electronic Device 120-m

FIG. 1

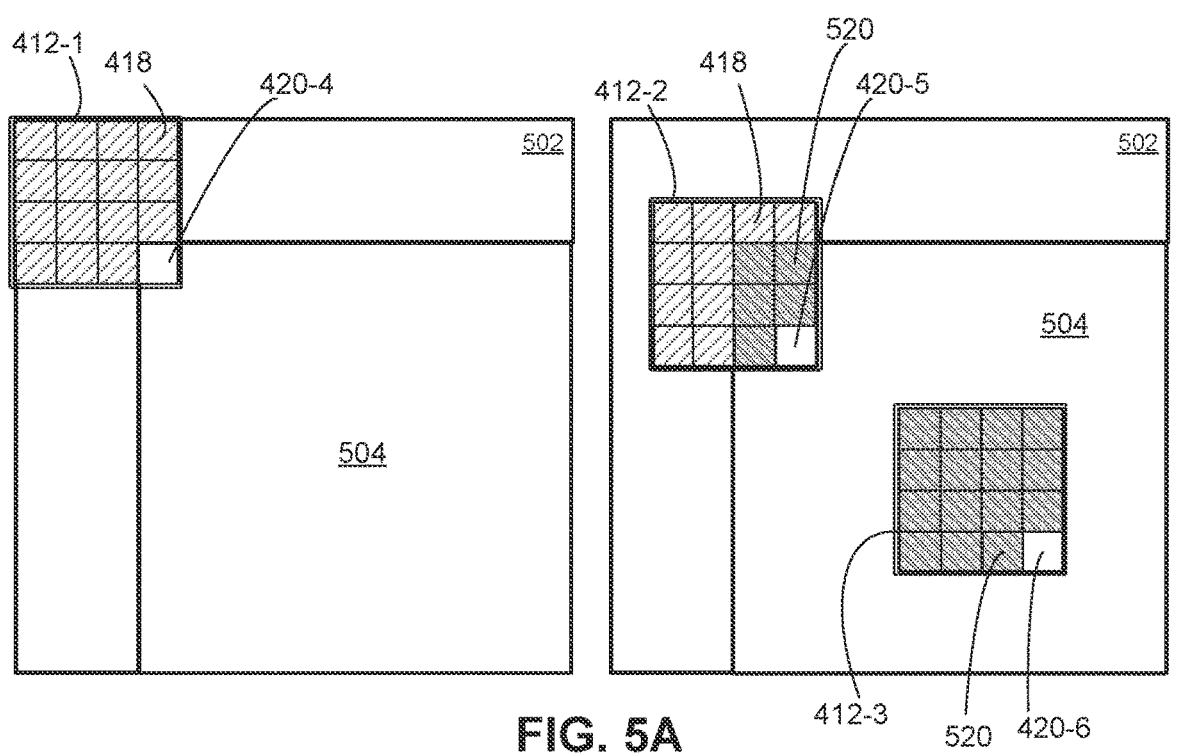
FIG. 5A
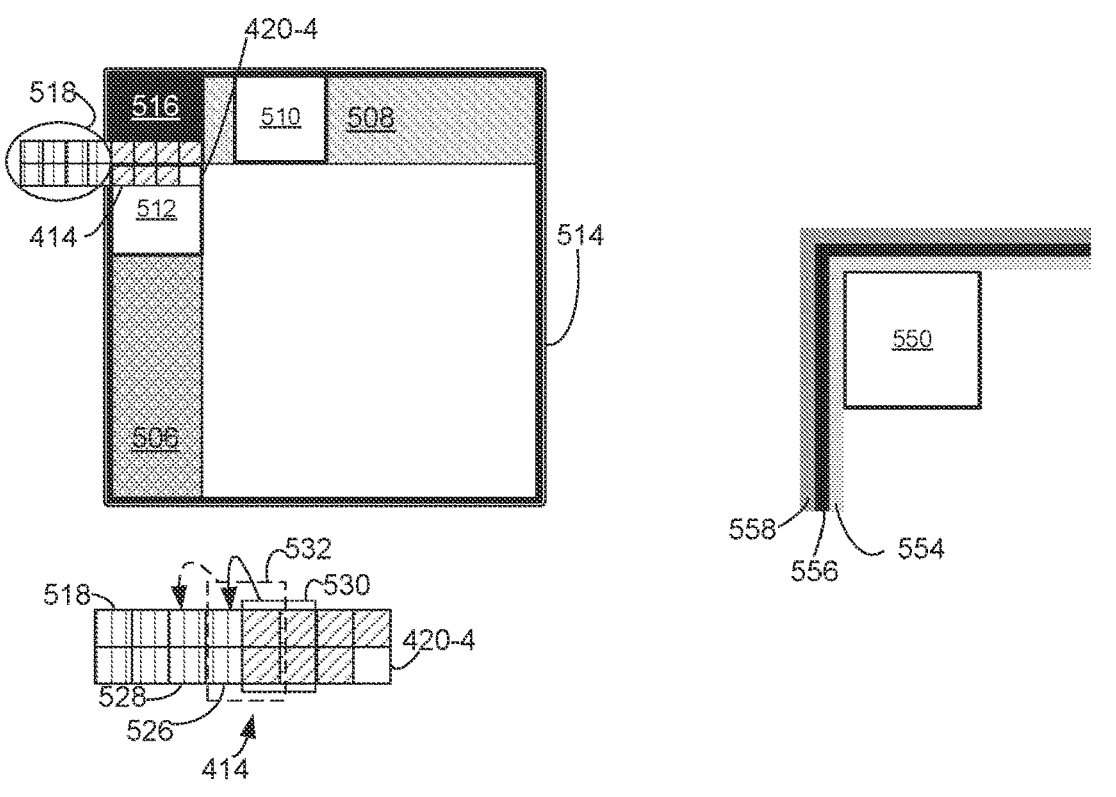
FIG. 5B                    FIG. 5C

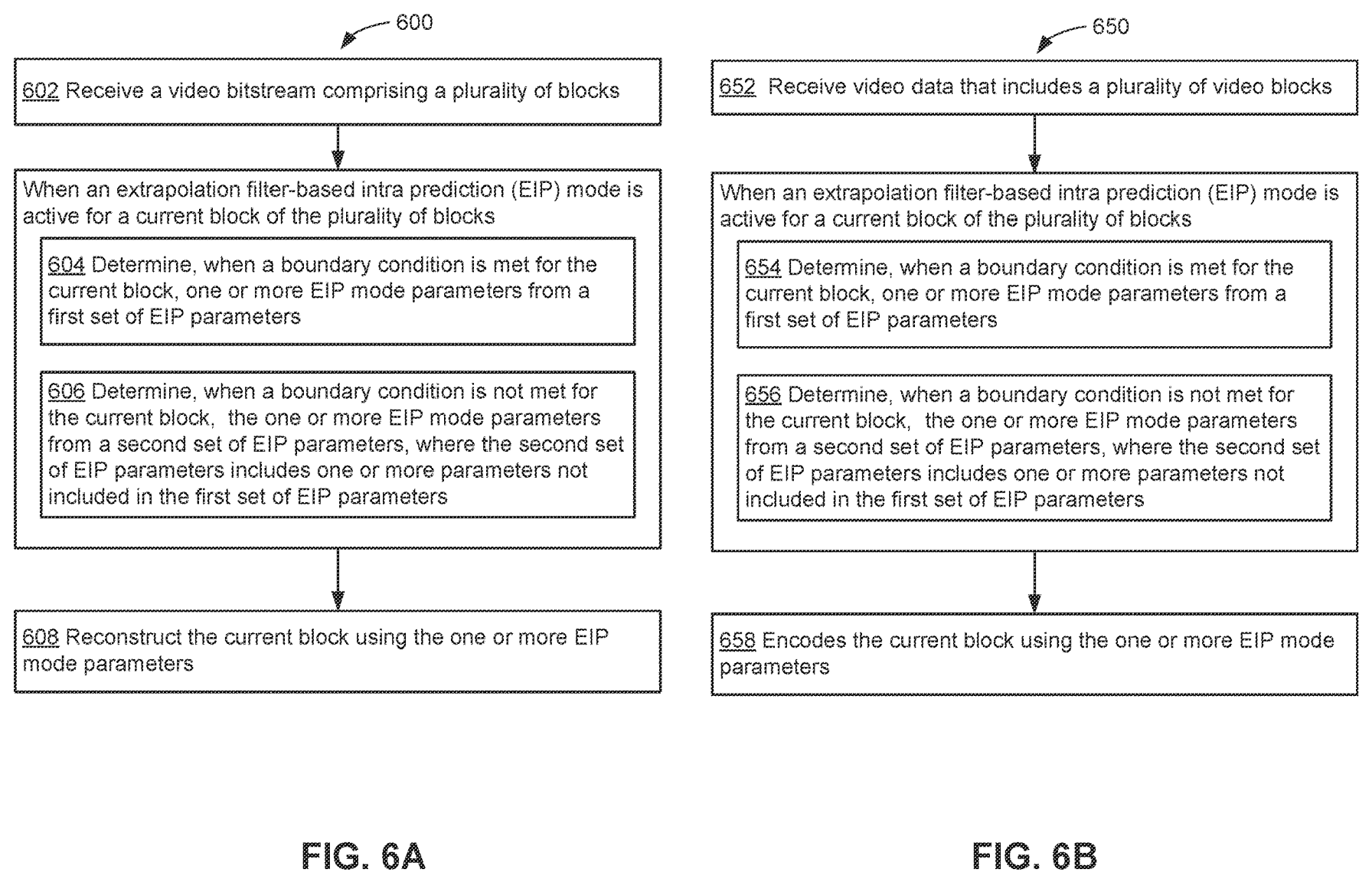

650

652  Receive video data that includes a plurality of video blocks

When an extrapolation filter-based intra prediction (EIP) mode is active for a current block of the plurality of blocks 654 Determine, when a boundary condition is met for the current block, one or more EIP mode parameters from a first set of EIP parameters 656 Determine, when a boundary condition is not met for the current block, the one or more EIP mode parameters from a second set of EIP parameters, where the second set of EIP parameters includes one or more parameters not included in the first set of EIP parameters 658 Encodes the current block using the one or more EIP mode parameters

602 Receive a video bitstream comprising a plurality of blocks

When an extrapolation filter-based intra prediction (EIP) mode is active for a current block of the plurality of blocks 604 Determine, when a boundary condition is met for the current block, one or more EIP mode parameters from a first set of EIP parameters 606 Determine, when a boundary condition is not met for the current block, the one or more EIP mode parameters from a second set of EIP parameters, where the second set of EIP parameters includes one or more parameters not included in the first set of EIP parameters 608 Reconstruct the current block using the one or more EIP mode parameters

FIG. 6A

SYSTEMS AND METHODS FOR ADAPTIVE EXTRAPOLATION FILTER BASED INTRA PREDICTION MODE

RELATED APPLICATIONS

This application claims priority to U.S. Provisional Patent Application No. 63/461,547, entitled "Adaptive Extrapolation Filter Based Intra Prediction Mode" filed Apr. 24, 2023, which is hereby incorporated by reference in its entirety.

TECHNICAL FIELD

The disclosed embodiments relate generally to video coding, including but not limited to systems and methods for implementing extrapolation filter-based intra prediction (EIP) modes.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to the extrapolation filter-based intra prediction mode (or "extrapolation filter intra prediction mode"). An extrapolation filter-based intra prediction may be processed in two steps. First, the extrapolation filter coefficients are obtained from neighboring reconstructed pixels of the current block with a predetermined template. Second, the extrapolation generates a predicted value position by position from top-left to bottom-right within the current block. The embodiments described herein include restricting EIP parameters when a current block satisfies boundary conditions. An advantage of determining whether a current block satisfies boundary conditions when using extrapolation filter-based intra prediction mode is ability to reduce signaling overhead (e.g., by signaling fewer indicators and/or signaling a smaller set).

In accordance with some embodiments, a method of video decoding includes (i) receiving a video bitstream comprising a plurality of blocks; when an EIP mode is active for a current block of the plurality of blocks and when a boundary condition is met for the current block, (ii) determining one or more EIP mode parameters from a first set of EIP parameters; when the boundary condition is not met for the current block, (iii) determining the one or more EIP mode parameters from a second set of EIP parameters, where the second set of EIP parameters includes one or more parameters not included in the first set of EIP parameters; and (iv) reconstructing the current block using the one or more EIP mode parameters.

In accordance with some embodiments, a method of video encoding includes (i) receiving video data that includes a plurality of video blocks; when an EIP mode is active for a current block of the plurality of blocks and when a boundary condition is met for the current block, (ii) determining one or more EIP mode parameters from a first set of EIP parameters; when the boundary condition is not met for the current block, (iii) determining the one or more EIP mode parameters from a second set of EIP parameters, where the second set of EIP parameters includes one or more parameters not included in the first set of EIP parameters; and (iv) encoding the current block using the one or more EIP mode parameters.

In accordance with some embodiments, a method of processing visual media data includes: (i) obtaining a source video sequence that includes a plurality of frames; and (ii) performing a conversion between the source video sequence and a video bitstream of visual media data, where the bitstream comprises: (a) a plurality of encoded blocks corresponding to the plurality of video blocks, the plurality of encoded blocks including a first block encoded using an EIP mode; when a boundary condition is met for the first block, (b) indication of a first set of EIP mode parameters for the first block; and when the boundary condition is not met for the first block, (iii) indication of a second set of EIP mode parameters for the first block, where the second set of EIP parameters includes one or more parameters not included in the first set of EIP parameters.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder). In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIGS. 5A, 5B and 5C illustrate applications of extrapolation filter-based intra prediction mode in accordance with some embodiments.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
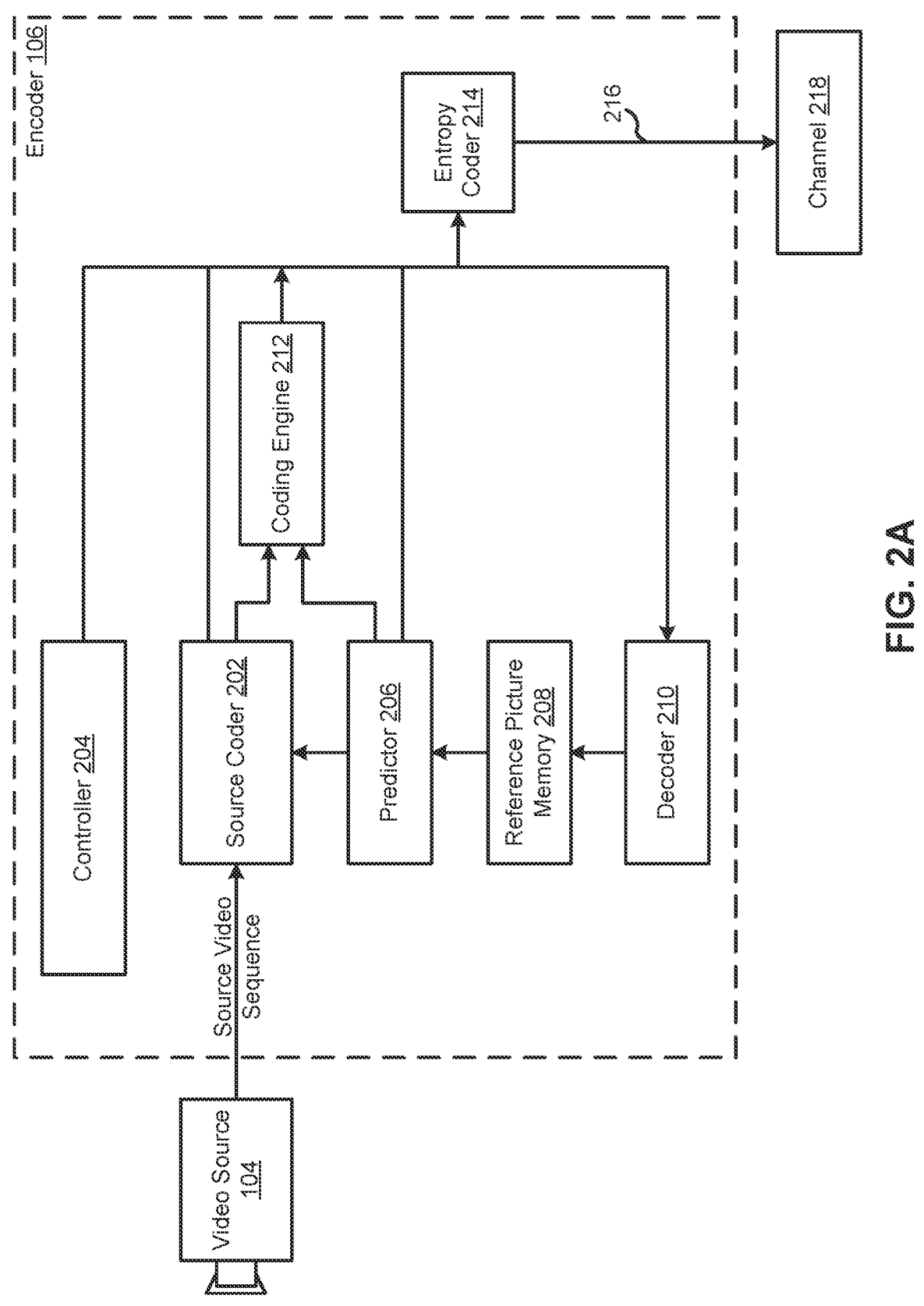
FIG. 2A is a block diagram illustrating example elements of an encoder component in accordance with some embodiments.

The present disclosure describes video/image compression techniques related to extrapolation filter-based intra prediction modes. Some embodiments, include determining whether the current block satisfies one or more boundary conditions, and when the current block satisfies the one or more boundary conditions, EIP mode parameters/settings are restricted. For example, when the current block is at an upper boundary and upper reconstruction samples are not available for the EIP mode calculations, the EIP reconstruction area options are restricted to reduce/minimize options that rely on upper reconstruction samples. An advantage of determining whether a current block satisfies boundary conditions when using an EIP mode is the ability to reduce signaling overhead (e.g., by signaling fewer indicators and/or signaling a smaller set).

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, e.g., setting of parameters and sub-group parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, e.g., coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, e.g., Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (e.g., blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
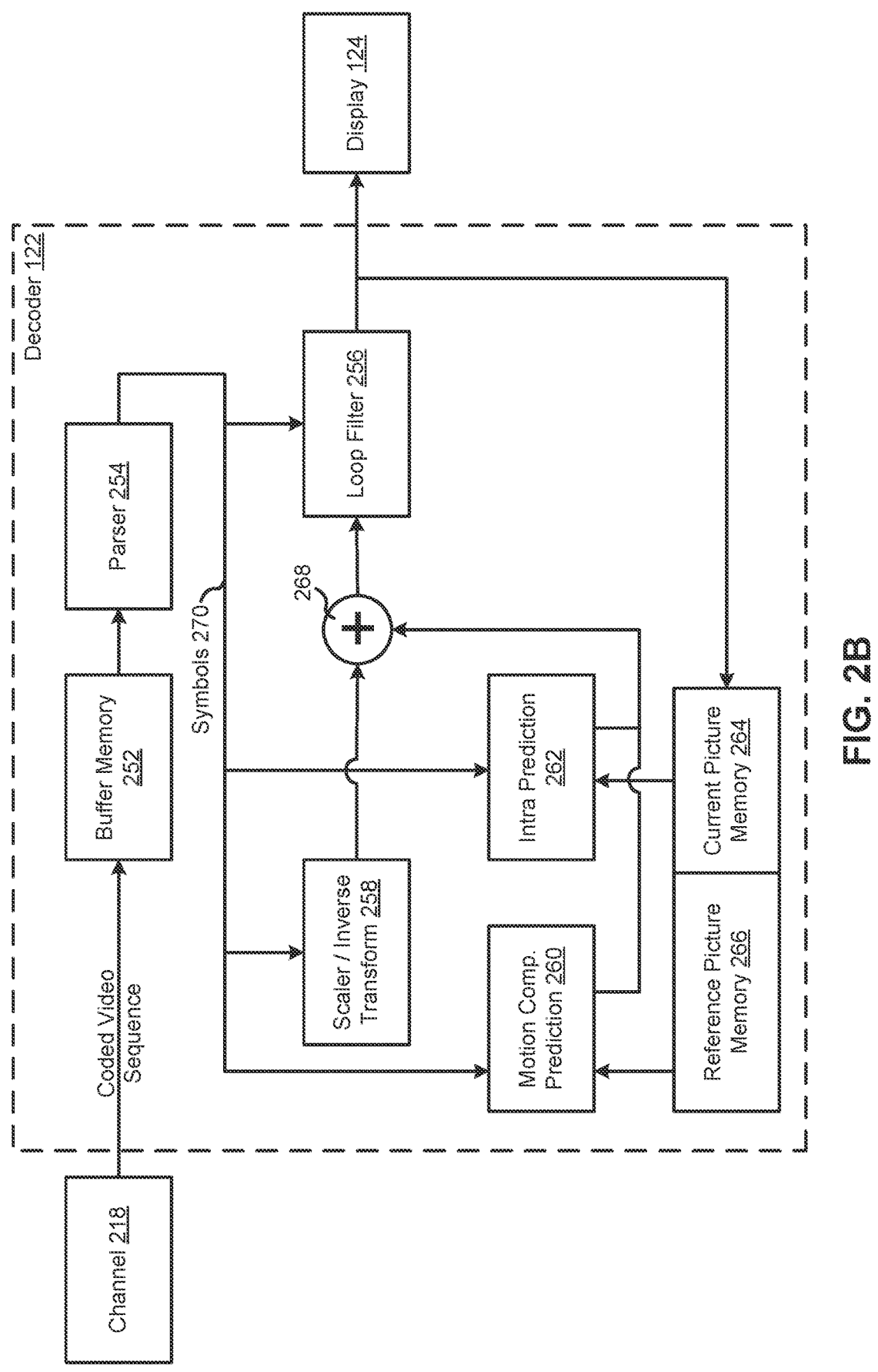
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, e.g., coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, e.g., information used to manage operation of the decoder component 122, and/or information to control a rendering device such as the display 124. The control information for the rendering device(s) may be in the form of, e.g., Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, e.g., X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, e.g., parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, e.g. megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
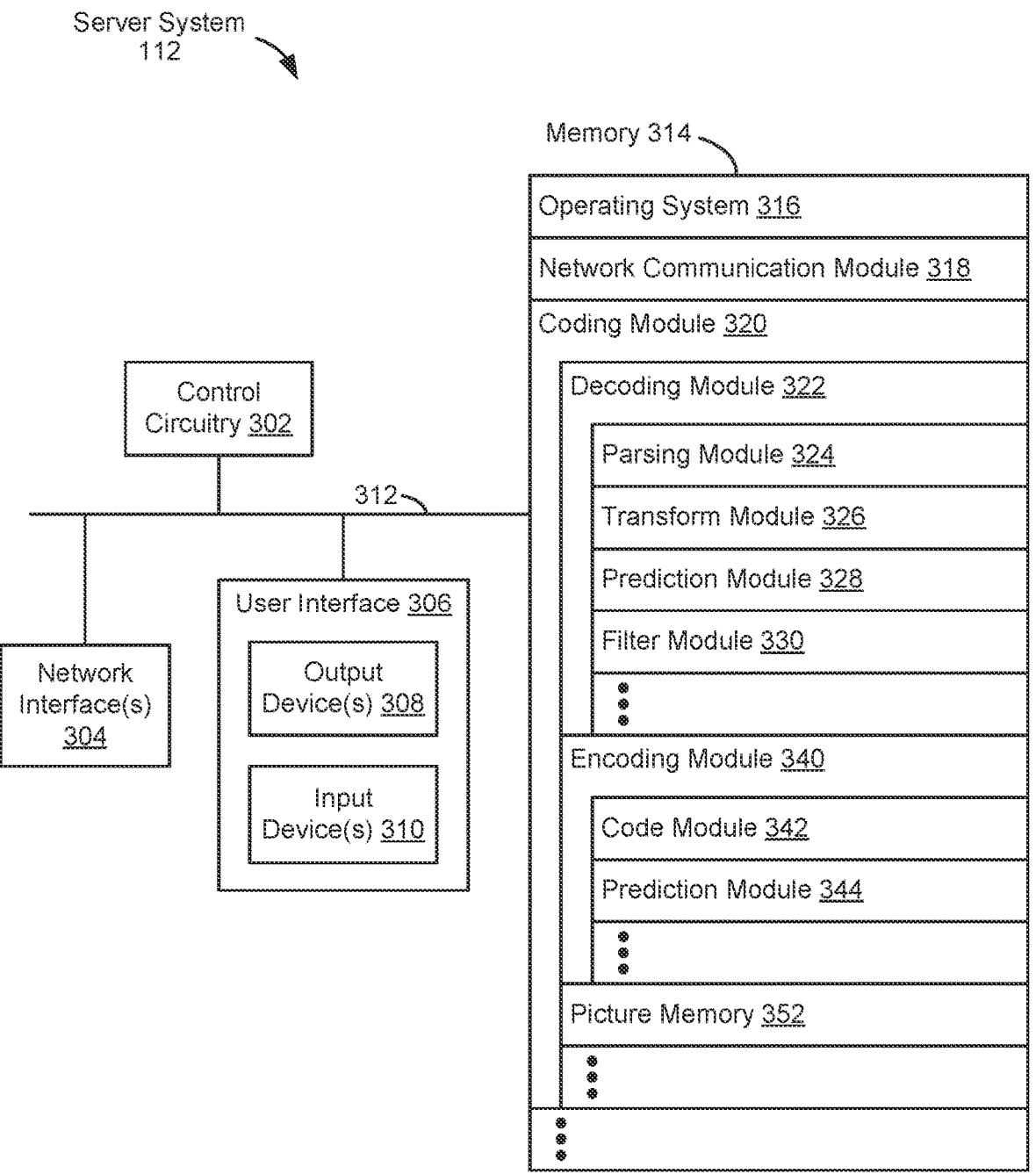
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). In the following, a transform may refer to a primary transform (e.g., a multiple transform selection (MTS) or a non-separable primary transform (NSPT)), or a secondary transform (e.g., a non-separable secondary transform (NSST) or a low frequency non-separable transform (LFNST)).

Transform coding may be applied to a prediction residual to remove potential spatial correlations. Some examples of transform kernels include type-2 DCT (DCT-2), type-7 DST (DST-7) and type-8 DCT (DCT-8). When the residual has an uneven distribution, DST-7 and DCT-8 may be more efficient than DCT-2 as the basis functions of DST-7 and DCT-8 may be more aligned with such statistics. Thus, coding efficiency may be improved by not using a single transform kernel for all prediction residuals, due to the diverse nature of image or video content.

As described below, an EIP mode can be used to decode a current block. The description below is based on decoding blocks in a frame, but apply analogously to the encoding of one or more blocks using the EIP mode. When an EIP mode is used to decode a current block (e.g., an indicator is optionally signaled in the bitstream to indicate that the bitstream contains information (e.g., encoded blocks) that is coded using the EIP mode), the intra prediction mode (e.g., one or more of the intra prediction modes shown in FIG. 4A, and/or other directional prediction mode information) for decoding the current block is not signaled in the video bitstream. Decoding the current block using the EIP mode may involve using a two-step process to select a transform kernel for the current block. For example, the transform kernel may be selected from intra prediction mode dependent transform sets, with each set having multiple candidates of transform kernels. Extrapolation filter coefficients may be obtained from a reconstruction area (e.g., containing reconstructed pixels that are neighboring pixels of the current block) adjacent the current block using a predetermined template, as explained below, with reference to FIGS. 4B, 4C, 5A, and 5B. Next, a predicted value may be generated by extrapolation, position by position (e.g., sample by sample), from top-left to bottom-right within the current block, as illustrated in FIG. 5A. In some embodiments, a mean value is removed when feeding the inputs to an EIP filter. For example, the value of the DC mode for the current block may be used as a mean value for the EIP prediction. The min and max values may be searched from the reconstructed pixels in the reconstructed area (e.g., consisting of thirteen columns and thirteen rows).

Figures 4A, 4B, 4C:
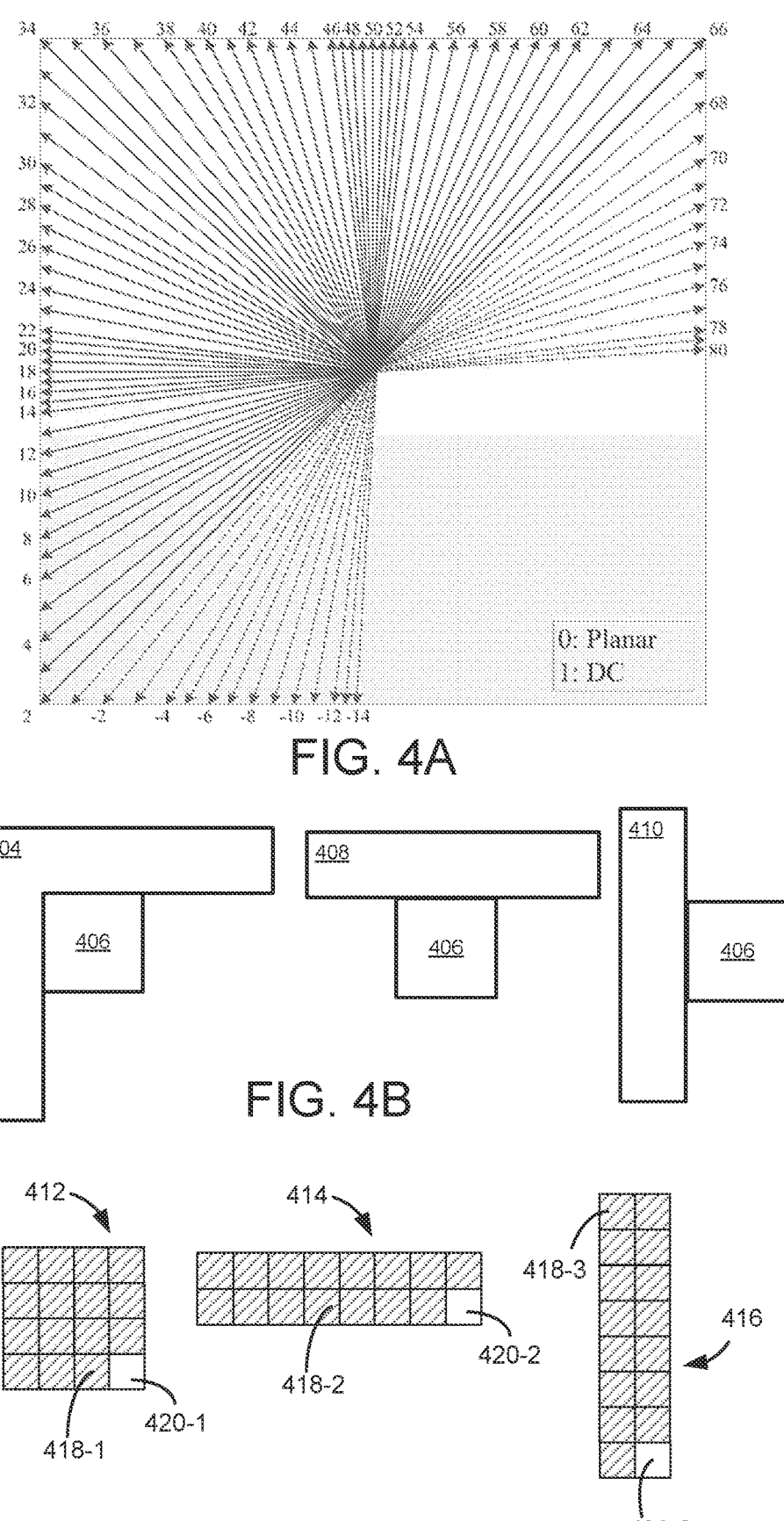
FIGS. 4A, 4B and 4C illustrate aspects of extrapolation filter-based intra prediction modes.

In some embodiments, the EIP mode includes three types (e.g., three types, or more than three types) of reconstructed areas and at least three filter shapes (e.g., three shapes, or more than three shapes), as shown in FIGS. 4B and 4C. FIG.

4B shows three different reconstruction areas 404, 408, and 410 in accordance with some embodiments. The reconstruction area 404 is a first type of reconstruction area that is L-shaped, and borders a top edge and left edge of a current block 406 (e.g., a prediction unit). The reconstruction area 408 is a second type of reconstruction area that is rectangular-shaped, having a width that is larger than its height (e.g., 3 columns by 8 rows), and borders a top edge of the current block 406. The reconstruction area 410 is a third type of reconstruction area that is rectangular-shaped, having a height that is larger than its width (e.g., 8 columns by 3 rows), and borders a left edge of the current block 406. In some embodiments, the EIP mode includes one or more additional reconstruction areas (e.g., having different numbers of columns and/or rows).

FIG. 4C shows different example filter shapes in accordance with some embodiments. A filter shape 412 is a first filter shape that is square shaped. The filter shape 412 includes 16 samples (e.g., positions), the fifteen shaded samples 418 in the filter shape 412 are provided as an input to the EIP mode, and the EIP mode provides a predicted output 420 at the sixteenth position in the filter shape 412. A filter shape 414 is a second type of filter shape that also includes 16 samples or positions. The filter shape 414 is rectangular-shaped, having a width that is larger than its height. A filter shape 416 is a third filter shape that is rectangular-shaped, having a height that is larger than its width. Each of the filter shape 412, the filter shape 414 and the filter shape 416 includes 16 samples (or positions), with the fifteen shaded samples 418 provided as an input to the EIP to yield the predicted output 420 at the sixteenth position. In some embodiments, the EIP mode includes one or more additional filter shapes (e.g., having different numbers of columns and/or rows). In some embodiments, when the current block 406 uses the EIP mode for prediction, the decoder decodes one or more relevant syntax elements to determine the selected type of reconstructed area and filter shape for the current block. In some embodiments, the selected filter slides in the selected reconstructed area with a one-pixel step to collect input samples and output samples of the EIP mode. In some embodiments, the auto-correlation matrix and cross-correlation vector are constructed while removing the mean value from input samples and output samples. In some embodiments, the EIP coefficients are obtained in a similar method as in a convolutional cross-component model (CCCM) used to predict chroma samples from reconstructed luma samples.

Instead of being limited to restricted set of intra prediction modes for EIP (e.g., only planar mode (e.g., mode 0) or DC mode (e.g., mode 1)), using information from the neighboring reconstructed blocks allows the EIP mode to be more adaptive, and may provide for a more efficient decoding process. For example, when neighboring reconstructed samples do not have much directionality (e.g., are decoded using DC mode or planar modes), the one or more features associated with the EIP mode of the current block can reflect the lack of directionality. In contrast, when the neighboring reconstructed samples have directionality (e.g., are coded using 45 angle degree mode such as mode 2 or mode 34, or have strong directionality), the one or more features associated with the EIP mode of the current block can reflect that directionality. As a result, using the one or more features associated with the EIP mode allows the current block to be coded using an intra prediction mode that is adaptive to the directionality of the neighboring reconstructed samples. In some embodiments, the one or more features associated with the EIP mode includes a directionality indicator that is derived on the fly (e.g., derived during the decoding process and not signaled in the bitstream). The directionality indicator may be used to indicate a presence or an absence of directionality, and/or specify an angle of a directional intra prediction mode (e.g., modes—14 to 80 depicted in FIG. 4A) for decoding the current block. The derived angle of the directional intra prediction mode may be an angle that matches a texture pattern of the current block.

In some embodiments, deriving the one or more features may be computationally more complicated. In some embodiments, the one or more features associated with the EIP mode (e.g., a directionality indicator) are signaled in the bitstream. While signaling the one or more features may have higher signaling costs, signaling may provide more flexibility for the encoder to instruct the decoder on how the transform kernel for the current block is to be selected. In some embodiments, the one or more features associated with the EIP mode for a current block decoded using the EIP mode is an index that is signaled in the bitstream for the current block. The signaled index may be used for selecting a transform kernel at both the encoder and the decoder.

The derived or signaled directionality indicator(s) can be used to map the EIP mode of the current block to one of the directional intra prediction modes (e.g., modes—14 to 80 depicted in FIG. 4A) or non-directional intra prediction modes (e.g., planar or DC modes). Different directional intra prediction modes may have different transform kernel preferences. By offering the ability to select transform kernels for specific directional intra prediction, characteristics of the current block can be more accurately represented, which can improve coding efficiency.

In some embodiments, the one or more features associated with the EIP mode include one or more intra prediction modes of neighboring blocks, which can be used to map the EIP mode of the current block to one of the directional intra prediction mode or non-directional intra prediction mode (e.g., planar or DC modes), and to select a transform kernel for the current block. For example, if the above neighbor and the left neighbor of the current block are coded using the 45-degree intra prediction mode (e.g., mode 34 in FIG. 4A), the same intra prediction mode can be used for the EIP mode of the current block.

In addition to, or instead of, using the one or more features associated with the EIP mode of the current block to derive a directionality indicator used to select a transform kernel for the current block, the one or more features can also be used to generate a prediction of the intra prediction mode of a subsequent block (e.g., a next block coded using a regular intra prediction mode, not an EIP mode). In some embodiments, the one or more features associated with the EIP mode of the current block include one or more intra prediction modes of the previously coded neighboring blocks and the EIP mode of the current block. The one or more features are then mapped to one of the directional intra prediction mode or non-directional intra prediction mode (e.g., planar or DC) for the next block that is coded using the intra prediction mode.

FIG. 5A shows an example of how the output from the filter shape 412-1 is used to generate a predicted sample 420-4 (e.g., the predicted output from the EIP mode) from a top left corner of the current block 504 towards a predicted sample 420-6 near a bottom right corner of the current block. In the filter shape 412-1, all fifteen input samples (418) are reconstructed samples. In the filter shape 412-2, there are 5 previously predicted samples 520 and 10 reconstructed samples. In the filter shape 412-3, all 15 samples used as input to the EIP mode are previously predicted samples. The change in the nature of the samples within the filter shape relates to the relative position of the EIP mode's predicted output within the current block 504.

A template-based intra mode derivation (TIMD) is a method for deriving an intra prediction mode for a sample based on information from neighboring samples (e.g., adjacent samples, or non-adjacent samples) in a template region (e.g., by the decoder component 122). The neighboring samples may be reconstructed samples or previously predicted samples, and are collectively referred to as "reconstructed neighbor samples" below. For each intra prediction mode in a most probable modes (MPM) list, a sum of absolute transformed differences (SATD) between the prediction and reconstructed neighbor samples of a template may be calculated. The intra prediction mode with the minimum SATD may be selected as the TIMD mode and used for the prediction of the current block. For example, to determine the intra prediction mode for a current block 550 in FIG. 5C using TIMD, two or more or templates 554, 556 and 558 may be used. Each of the L-shape templates 554, 556 and 558 includes a plurality of samples (e.g., 13 samples, 13 samples in each horizontal portion and each vertical portion of the L-shape template). A delta representing the difference between a candidate predicted value based on a candidate prediction mode in the MPM list and a value from reconstructed neighbor sample is derived for the current block 550 for each template. The candidate prediction mode having the minimal prediction error may be selected as the intra prediction mode for the current block. For example, if the direction of candidate prediction mode is aligned with the reconstructed neighbor samples, the error (e.g., SATD) is small, and thus information about the directionality of the current block may be inferred. The candidate prediction mode is then selected as the TIMD mode and used for the prediction of the current block 550. In some embodiments, coded information from the template 554 is taken into account in addition to information about the current block 550, and used to provide predictions for template 556, which may then be used to provide predictions for template 558.

Another approach involves using decoder-side intra mode derivation (DIMD) to derive the intra prediction mode for a current block based on information from reconstructed neighboring samples. For example, a gradient of the coded information in each reconstructed neighboring sample is calculated and used to populate a histogram. The prediction mode having the highest frequency may be selected as the intra prediction mode for the current block.

In some embodiments, the one or more features associated with the EIP mode include a directionality indicator specified by an intra prediction mode derived using the TIMD or DIMD approach. Thus, the one or more features include a directionality indicator derived by the neighboring reconstructed samples. In some embodiments, the selection of either TIMD or DIMD to derive the intra prediction mode may be signaled. In some embodiments, TIMD is always selected and a pair of templates (e.g., template 554 and template 556) are used to predict each other. In this way, the intra prediction mode having the minimum prediction error may be identified as the intra prediction mode to be used for the current block. In turn, the derived intra prediction may also be used as the directionality indicator for the EIP mode of the current block. In some embodiments, the one of more features include a directionality indicator derived using intra prediction modes of neighboring samples (e.g., signaled syntax indicating the intra prediction mode of neighboring sample).

In some embodiments, the one or more features associated with the EIP mode include a directionality indicator derived using coefficient values of the filters used in the EIP mode. For example, each of the gray samples (e.g., 418-1, 418-2, 418-3, in the filter shapes 412, 414, and 416 illustrated in FIG. 4C) has a respective coefficient and the coefficients and gray samples may collectively be used as the input to the EIP mode. The predicted output (e.g., 420-1, 420-2, and 420-3) may be a weighted sum of the gray samples, and the coefficients of the gray samples may present directionality information. In some embodiments, the coefficient values of the filters used in EIP mode are further quantized to a limited set of combinations, and each combination may optionally be mapped to a value of the directionality indicator. In some embodiments, the magnitudes (optionally quantized magnitudes) of coefficients of the filters used in EIP mode are optionally further provided (e.g., as an input) to look-up table to determine a value of the directionality indicator. In some embodiments, the signed values (optionally quantized signed values, could be negative) of coefficients of the filters used in EIP mode are optionally further provided (e.g., as an input) to look-up table to determine a value of the directionality indicator.

In some embodiments, the one or more features associated with the EIP mode are derived based on the filter shapes. For example, different filter shapes may have different supported transform types. In some embodiments, the supported transform type is derived from (e.g., mapped to) an aspect ratio of the filter shape.

In some embodiments, when an EIP mode is active for a current block and a boundary condition is met for the current block, one or more EIP mode parameters are selected from a first set of EIP parameters. When the boundary condition is not met for the current block, the one or more EIP mode parameters are selected from a second set of EIP parameters. The second set of EIP parameters may include one or more parameters not included in the first set of EIP parameters. For example, the second set of EIP parameters includes the three types of reconstruction areas shown in FIG. 4B, whereas the first set of EIP parameters is a subset of the second set of EIP parameters (e.g., the first set includes only reconstruction areas 404 and 408). In some embodiments, the second set of EIP parameters includes more than the three types of reconstruction areas illustrated in FIG. 4B. In some embodiments, the usage of the first set of EIP parameters is not signaled (e.g., is derived at the decoder component 122).

FIG. 5B shows a unit 514 that may correspond to a picture, a subpicture, a slice, or a tile. In some embodiments, the boundary condition is satisfied when the current block is at a first relative position from a picture boundary, a subpicture boundary, a slice boundary, and/or a tile boundary. For example, a current block 510 has a first relative position (e.g., is within a threshold number of rows from a top edge, and/or is within) with respect to a top boundary portion 508. The top boundary portion may correspond to a picture/subpicture/slice/tile boundary, depending on nature of the unit 514. When the current block 510 is within the top boundary portion 508 and/or within a threshold number of rows from a top edge of the top boundary portion 508, a EIP mode parameter that corresponds to the type of reconstruction area may be restricted to a reconstruction area that includes only left reconstruction samples (e.g., the reconstruction area 410 shown in FIG. 4B). For example, when the number of available top rows of reconstruction samples above a current block is less than a threshold, the reconstruction area 410 having only left reconstruction samples is used to generate the predicted output 420. When the number of available top rows is less than the threshold (e.g., of two or three lines), then results generated from that top region (e.g., similar to reconstruction area 408) may not be reliable. In some embodiments, when the current block 510 meets the boundary condition, the type of reconstruction area is not signaled, but is derived to correspond to the reconstruction area 410 shown in FIG. 4B. Optionally, the EIP mode is not active for a current block that is within the top boundary portion 508. In addition, or alternatively, a EIP mode parameter that corresponds to the filter shape may be restricted to a subset of filter shapes when the current block 510 is within the top boundary portion 508 and/or within a threshold number of rows from a top edge of the top boundary portion 508. For example, the restricted subset of filter shapes may include only the filter shape 416 shown in FIG. 4C.

For example, a current block 512 has a second relative position (e.g., is within a threshold number of columns from a left edge, and/or is within) with respect to a left boundary portion 506. The left boundary portion 506 may correspond to a picture/subpicture/slice/tile boundary, depending on nature of the unit 514. When the current block 512 is within the left boundary portion 506 and/or within a threshold number of lines (e.g., columns) from a left edge of the left boundary portion 506, the type of reconstruction area includes only top reconstruction samples (e.g., the reconstruction area 408 shown in FIG. 4B). For example, when the number of available left columns of reconstruction samples to the left of the current block is less than a threshold, the reconstruction area 408 having only top reconstruction samples is used to generate the predicted output 420. In some embodiments, when the current block 512 meets the boundary condition, the type of reconstruction area is not signaled, but is derived to correspond to the reconstruction area 408 shown in FIG. 4B. Optionally, the EIP mode is not active for current blocks that are within the left boundary portion 506. In addition, or alternatively, a EIP mode parameter that corresponds to the filter shape may be restricted to a subset of filter shapes when the current block 512 is within the left boundary portion 506 and/or within a threshold number of columns from a left edge of the left boundary portion 508. For example, the restricted subset of filter shapes may include only the filter shape 414 shown in FIG. 4C.

For a set of three reconstruction areas and a set of three filter shapes, there are nine combinations of reconstruction area—filter shape pairs (e.g., three combinations from the reconstruction area 404 being paired with each of filter shape 412, filter shape 414, and filter shape 416; three combinations from the reconstruction area 408 being paired with each of filter shape 412, filter shape 414, and filter shape 416; and three combinations from the reconstruction area 410 being paired with each of filter shape 412, filter shape 414, and filter shape 416). In some embodiments, when a boundary condition is met for the current block, the combinations are restricted to a subset of the nine combinations. For example, each type of reconstruction area may be paired with only two of the three filter shapes, or each type of reconstruction area may only be paired with one of the filter shapes. In some embodiments, the reconstruction area 404 is only paired with the filter shape 412, the reconstruction area 408 is only paired with the filter shape 414, and the reconstruction area 410 is only paired with the filter shape 416.

In some embodiments, for a coding block that is location in a region 516 of the unit 514 (e.g., at a partition boundary, or at a top-left corner of the unit 514), no indicator for the EIP mode is signaled, indicating that the EIP mode is inactive for the coding block.

In some embodiments, when the current block is coded by an EIP mode, and only partial samples in the requested reconstruction area type (e.g., and the associated filter shape) are available, the missing samples are padded (e.g., using a predefined value, using a copy of another sample, by extrapolating from available samples, or by interpolating using available samples) to construct a reconstruction area having a completed set of samples. For example, in FIG. 5B, the current block 512 satisfies the boundary condition (e.g., the current block 512 is within the left portion boundary 506) and the EIP mode parameter that corresponds to the filter shape of the current block may indicate the usage of the filter shape 414 for the current block 512, and optionally includes the usage of reconstruction area 408. As described with respect to FIG. 4C, 15 input samples (shaded squares) are used to generate a predicted output 420-4 from the filter shape 414. In FIG. 5C, the eight samples in a region 518 are missing from the filter shape 414 (e.g., are outside the reconstruction area, and/or outside the unit 514). In some embodiments, a predefined (e.g., constant) value is used to pad the missing samples in the filter shape (e.g., the eight missing samples in the region 518). An advantage of padding the missing sample (e.g., within the reconstruction area, and/or within filter samples) is the ability to use a unified processing scheme for both reconstruction areas or filter shapes having missing samples and reconstruction areas or filter shapes that have a complete set of samples. Having a unified processing scheme may reduce hardware requirement (e.g., using a shared or common pipeline for different processing scenarios).

In some embodiments, the predefined value is set as $1 <<$ (bitdepth-1) where bitdepth is the bit depth of luma or chroma samples. For example, when the bit depth (bitdepth) of a luma sample is 4, the predefined value is $1*2^3=8$. In some embodiments, the available rows and columns are extended towards the missing rows and columns in the template of reconstruction area. For example, in FIG. 5B, the seven samples to the right of the region 518 are shifted into the region 518 to help construct the eight missing samples (e.g., padding the missing eighth sample, and/or using a copy of one of the seven samples for the eighth sample).

In some embodiments, the padded samples are derived line by line (e.g., row by row, column by column). For example, the missing samples in the line closest to the available reconstructed area are derived from N $(N>=1)$ available neighboring samples. In some embodiments, a mean of the N neighboring samples is used to fill the missing samples in the line closest to the N neighboring samples. The operation is repeated on the newly padded line to obtain the values for filling the missing samples in the second closest line (e.g., and subsequently the third closest, and the fourth closest, etc.) to the available reconstruction area until all missing samples are filled, in a manner analogous to TIMD, but the derived values are used for padding and not for prediction. For example, in the enlarged version of the filter shape 414 shown at the bottom of FIG. 5B, the region 518 includes a first line 526 that is closest to the available reconstruction area. FIG. 5B shows an example in which N=4, and the four available sample within the region 530 are used to derive a value (e.g., a mean, a maximum, or a minimum) for the samples in the first line 526. Subsequently, the next four available sample within the region 532, which include the newly padded samples from the first line 526, are used to derive a value for the samples in the second line 528. The process is repeated until all four missing lines are filled.

The one or more features of the EIP mode may be used for one or more of the following: (1) to select a primary transform set, or a primary transform type, (2) to select a secondary transform set, or a secondary transform type, and/or (3) to derive the most probable intra prediction mode for other coding blocks (e.g., the coding block subsequent to the current block). A secondary transform is an additional transform process subsequent to the primary transform. For example, in NSST, a non-separable secondary transform is applied to lower-frequency coefficients so that computational complexity for non-separable transform may be reduced.

An LFNST set indicates a group of transform kernel options that can be selected in LFNST. In some embodiments, (e.g., in VVC) four LFNST sets, denoted as IfnstSetIdx, are defined and the selection of the sets may depend on the intra prediction mode. Three different options of LFNST kernels are provided in each of the four LFNST set, and an index (e.g., between 0 to 2) is used to indicate which of the three kernels is to be used. For example, when the index is 0, LFNST may not be applied. Otherwise, an LFNST is applied using one of the two kernels in the LFNST set and the selection is indicated by the LFNST index.

As another example, if an intra prediction mode of a current block is the planar vertical mode, the horizontal intra prediction mode may be used to derive a transform kernel in the MTS set and the LFNST set. Also, if an intra prediction mode of a current block is the planar horizontal mode, the vertical intra prediction mode may be used to derive a transform kernel in MTS set and LFNST set.

In some embodiments, separate transform sets are used for the EIP mode. For example, when the EIP mode is selected for the current block, a separate set of primary and/or secondary transform may be applied. Alternatively, there may be some overlap between the primary transform set and/or the secondary transform set used for the EIP mode and for non-EIP modes. For example, some existing transform sets for non-EIP modes may not be optimal for EIP modes (and thus excluded from consideration for EIP modes) whereas other existing transform sets may also be used for the EIP modes.

In some embodiments, multiple kernels are available for each transform set. For example, an indicator (e.g., optionally a signaled indicator) determines a transform set to be used (e.g., one of 12 transform sets), and a second indicator (e.g., optionally signaled) is used to determine which kernel within the set is to be used for the EIP mode. In some embodiments, different kernels are preferred for an intra prediction mode of the same angle depending on whether the IP mode is active. As an example, a sample might be coded using the 45° intra prediction mode and the sample contains very sharp features, while another sample may also be coded using the 45° intra prediction mode but the sample contains very smooth features. The two samples may prefer different transform sets, and/or different kernels within a particular transform set. In some embodiments, there are 12 transform sets, and each set has 3 kernels (e.g., the three kernels are all for the same angle). Given an intra prediction mode for the EIP mode, one of the 12 sets is selected, and a signaled indicator may indicate which one of the three kernels is to be used. In some embodiments, additional transform sets are added for the EIP modes (e.g., resulting in a total of 15 or more sets of transform).

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream comprising a plurality of blocks. When an extrapolation filter-based intra prediction (EIP) mode is active for a current block of the plurality of blocks, the system determines (604), when a boundary condition is met for the current block, one or more EIP mode parameters from a first set of EIP parameters. The system determines (606), when a boundary condition is not met for the current block, the one or more EIP mode parameters from a second set of EIP parameters, where the second set of EIP parameters includes one or more parameters not included in the first set of EIP parameters. The system reconstructs (610) the current block using the one or more EIP mode parameters. For example, when the current block is coded by an EIP mode, only a subset of all the pre-defined types of reconstruction area is applicable and signaled under certain conditions. For example, the conditions are related to the relative position of the current block inside the picture/subpicture/slice/tile. In some embodiments, the one or more EIP mode parameters are determined from the first set of EIP parameters in accordance with a determination that the boundary condition is met. In some embodiments, the one or more EIP mode parameters are determined from the second set of EIP parameters in accordance with a determination that the boundary condition is not met.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data that includes a plurality of video blocks. When an extrapolation filter-based intra prediction (EIP) mode is active for a current block of the plurality of blocks, the system determines (654), when a boundary condition is met for the current block, one or more EIP mode parameters from a first set of EIP parameters. The system determines (656), when the boundary condition is not met for the current block, the one or more EIP mode parameters from a second set of EIP parameters, where the second set of EIP parameters includes one or more parameters not included in the first set of EIP parameters. The system encodes (658) the current block using the one or more EIP mode parameters. As described previously, the encoding process may mirror the decoding processes described herein (e.g., the EIP embodiments described above). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 600) of video decoding. In some embodiments, the method is performed at a computing system (e.g., the server system 112) having memory and one or more processors. In some embodiments, the method is performed at a coding module (e.g., the coding module 320). The method includes: (i) receiving a video bitstream (e.g., a coded video sequence) comprising a plurality of blocks; when an EIP mode is active for a current block of the plurality of blocks: when a boundary condition is met for the current block, (ii) determining one or more EIP mode parameters from a first set of EIP parameters; when the boundary condition is not met for the current block, (iii) determining the one or more EIP mode parameters from a second set of EIP parameters, where the second set of EIP parameters includes one or more parameters not included in the first set of EIP parameters; and (iv) reconstructing the current block using the one or more EIP mode parameters. For example, when the current block is coded by an EIP mode, only a subset of all the pre-defined types of reconstruction area is applicable and signaled under certain conditions. For example, the conditions are related to the relative position of the current block inside the picture/subpicture/slice/tile. In some embodiments, the one or more EIP mode parameters are determined from the first set of EIP parameters in accordance with a determination that the boundary condition is met. In some embodiments, the one or more EIP mode parameters are determined from the second set of EIP parameters in accordance with a determination that the boundary condition is not met.

(A2) In some embodiments of A1, the one or more EIP mode parameters comprise a parameter for a reconstruction area for the EIP mode. For example, the parameter for the reconstruction area is an index, a size, or a shape for the reconstruction area.

(A3) In some embodiments of A1 or A2, the one or more EIP mode parameters comprise a parameter for a filter shape for the EIP mode. For example, the parameter for the filter shape is an index, a size, or a shape for the filter shape.

(A4) In some embodiments of any of A1-A3, the method further includes parsing, from the video bitstream, an indicator indicating whether a current block of the plurality of blocks is to be decoded using an extrapolation filter intra prediction (EIP) mode. In some embodiments, in accordance with a determination that the indicator indicates that the current block is to be decoded using the EIP mode, the one or more EIP mode parameters are determined. In some embodiments, in accordance with a determination that the indicator indicates that the current block is not to be decoded using the EIP mode, one or more EIP mode parameters are not determined (e.g., the computing system forgoes determining the one or more EIP mode parameters).

(A5) In some embodiments of any of A1-A4, the boundary condition involves a picture boundary, a subpicture boundary, a slice boundary, and/or a tile boundary. For example, depending on the relative position of the current block inside the picture/subpicture/slice/tile, different subsets of predefined types of reconstruction area are applicable.

(A6) In some embodiments of any of A1-A5, the boundary condition comprises the current block being located at a top partition boundary. For example, if the coding block is located at the top picture, subpicture, slice, or tile boundary, only a subset of the predefined types of reconstruction area (and/or filter types) are applicable, e.g., only using (or emphasizing) the left reconstruction samples.

(A7) In some embodiments of any of A1-A6, the boundary condition comprises the current block being located at a left partition boundary. For example, if the coding block is located at the left picture, subpicture, slice, or tile boundary, only a subset of the predefined types of reconstruction area (and/or filter types) are applicable, e.g., only using (or emphasizing) the top reconstruction samples.

(A8) In some embodiments of A1-A7, the method further includes when the current block is located at a partition boundary, determining that the EIP mode is inactive for the current block. In some embodiments, the determination that the current block is located at the partition boundary is a determination that the current block is within a predetermined threshold number of lines from the partition boundary. In some embodiments, in accordance with a determination that the current block is located at a partition boundary, determining that the EIP mode is inactive for the current block.

(A9) In some embodiments of A8, the partition boundary is a top-left partition boundary. For example, if the coding block is located at the top-left picture, subpicture, slice, or tile corner, the EIP mode is not applicable or signaled.

(A10) In some embodiments of A1-A9, the boundary condition corresponds to a number of available reconstruction samples for the current block. For example, the condition is related to the number of available top rows of reconstruction samples and/or the number of available left columns of reconstruction samples. Depending on the number of available top rows of reconstruction samples and/or the number of available left columns of reconstruction samples, different subsets of predefined types of reconstruction areas (and/or filter shapes) are applicable.

(A11) In some embodiments of A10, the boundary condition is whether a number of available top rows is less than a predetermined threshold. For example, if the number of available top rows of reconstruction samples is less than a given threshold, only a subset of the predefined types of reconstruction areas (and/or filter shapes) is applicable, e.g., the reconstruction area only includes left reconstruction samples. In some embodiments, the predetermined threshold is a non-negative integer value (e.g., of samples, lines, rows, or columns).

(A12) In some embodiments of A10 or A11, the boundary condition is whether a number of available left columns is less than a predetermined threshold. For example, if the number of available left columns of reconstruction samples is less than a given threshold, only a subset of the predefined types of reconstruction area (and/or filter shapes) is applicable, e.g., the reconstruction area only includes top reconstruction samples. In some embodiments, the predetermined threshold is a non-negative integer value (e.g., of samples, lines, rows, or columns).

(A13) In some embodiments of any of A1-A12, when the EIP mode is active for the current block and when one or more samples in a reconstruction area for the EIP mode are unavailable, padding the one or more samples for the EIP mode. For example, when the current block is coded by an EIP mode, and only partial samples in the requested reconstruction area type are available, then the missing samples are padded to construct a complete size of reconstruction area. In some embodiments, the one or more samples for the EIP mode are padded in accordance with a determination that the one or more samples are unavailable.

(A14) In some embodiments of A13, padding the one or more samples comprises using a predefined constant value to pad the one or more samples. For example, a predefined constant value is used to pad the missing sample.

(A15) In some embodiments of A14, the predefined constant value is based on a sample bit depth. For example, the value can be set as $1 << (\text{bitdepth}-1)$ where bitdepth is the bit depth of luma or chroma samples, and $<<$ is the left shift operator.

(A16) In some embodiments of any of A13-A15, padding the one or more samples comprises extending available sample values to pad the one or more samples. For example, the available rows and columns are extended towards the missing rows and columns in the template of the reconstruction area. In some embodiments, the padded samples are derived line by line (e.g., row by row or column by column), with the samples in the closest line to the available reconstructed area derived from N ($N>=1$) neighboring samples. e.g., mean of N neighboring samples. The same operation may be applied to the newly padded line in order to derive second closest line, 3rd closest line, etc. until the complete size of reconstructed area is filled.

(A17) In some embodiments of any of A1-A16, the first set of EIP parameters comprise a first set of reconstruction area types and filter shapes for the EIP mode, the second set of EIP parameters comprise a second set of reconstruction area types and filter shapes for the EIP mode, and the first set of reconstruction area types and filter shapes for the EIP mode comprises a subset of the second set of reconstruction area types and filter shapes for the EIP mode. For example, only a predefined combinations of filter shape and reconstructed area are allowed for the boundary cases. For example, the number of combinations of filter shape and reconstructed area may smaller than 9 (e.g., used for the second set), e.g., 3 or 6.

(B1) In another aspect, some embodiments include a method (e.g., the method 650) of video encoding. In some embodiments, the method is performed at a computing system (e.g., the server system 112) having memory and one or more processors. In some embodiments, the method is performed at a coding module (e.g., the coding module 320). The method includes: (i) receiving video data that includes a plurality of video blocks; when an EIP mode is active for a current block of the plurality of blocks: when a boundary condition is met for the current block, (ii) determining one or more EIP mode parameters from a first set of EIP parameters; when the boundary condition is not met for the current block, (iii) determining the one or more EIP mode parameters from a second set of EIP parameters, where the second set of EIP parameters includes one or more parameters not included in the first set of EIP parameters; and (iv) encoding the current block using the one or more EIP mode parameters.

(B2) In some embodiments of B1, the system further includes instructions for signaling, via a video bitstream, an indicator indicating whether a current block of the plurality of blocks is to be decoded using the EIP mode.

(C1) In another aspect, some embodiments include a method of visual media data processing. In some embodiments, the method is performed at a computing system (e.g., the server system 112) having memory and one or more processors. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data, where the video bitstream includes: (a) a plurality of encoded blocks corresponding to the plurality of video blocks, the plurality of encoded blocks including a first block encoded using an extrapolation filter-based intra prediction (EIP) mode; when a boundary condition is met for the first block, (b) indication of a first set of EIP mode parameters for the first block; and when the boundary condition is not met for the first block, (c) indication of a second set of EIP mode parameters for the first block, where the second set of EIP parameters includes one or more parameters not included in the first set of EIP parameters.

(D1) In one aspect, some embodiments include a method of video decoding. In some embodiments, the method is performed at a computing system (e.g., the server system 112) having memory and one or more processors. In some embodiments, the method is performed at a coding module (e.g., the coding module 320). The method includes: (i) receiving a video bitstream comprising a plurality of blocks; when an EIP mode is active for a current block of the plurality of blocks: (ii) identifying a reconstruction area for the EIP mode; when the reconstruction area includes one or more unavailable samples, (iii) deriving one or more padded samples by padding the one or more unavailable samples and (iv) reconstructing the current block according to the EIP mode using the one or more padded samples. For example, a predefined constant value (e.g., based on sample bitdepth) is used to pad each missing sample. As another example, the available rows and columns are extended towards the missing rows and columns in the template of reconstruction area. As another example, the padded samples are derived line by line with the samples in the closest line to the available reconstructed area derived from N neighboring samples.

(D2) In some embodiments of D1, the method further includes, when a boundary condition is met for the current block, (i) determining one or more EIP mode parameters from a first set of EIP parameters; and when the boundary condition is not met for the current block, (ii) determining the one or more EIP mode parameters from a second set of EIP parameters, where the second set of EIP parameters includes one or more parameters not included in the first set of EIP parameters; and where the current block is reconstructed using the one or more EIP mode parameters.

(D3) In some embodiments of D1 or D2, the method further includes any of the various techniques described above with respect to A1-A17.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A17, B1-B2, C1, and D1-D3 above).

In yet another aspect, some embodiments include a non-transitory computer-readable storage medium storing one or more sets of instructions for execution by control circuitry of a computing system, the one or more sets of instructions including instructions for performing any of the methods described herein A1-A17, B1-B2, C1, and D1-D3 above).

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition is true]" or "when [a stated condition precedent is true]" can be construed to mean "upon determining" or "in response to determining" or "in accordance with a determination" or "upon detecting" or "in response to detecting" that the stated condition precedent is true, depending on the context. As used herein, N refers to a variable number. Unless explicitly stated, different instances of N may refer to the same number (e.g., the same integer value, such as the number 2) or different numbers.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a plurality of blocks; and
   when an extrapolation filter-based intra prediction (EIP) mode is active for a current block of the plurality of blocks:
      when a boundary condition is met for the current block, determining one or more EIP mode parameters from a first set of EIP parameters, the boundary condition corresponding to at least one of:
         a first number of available top rows of reconstruction samples being less than a first threshold, or
         a second number of available left columns of reconstruction samples being less than a second threshold;
      when the boundary condition is not met for the current block, determining the one or more EIP mode parameters from a second set of EIP parameters, wherein the second set of EIP parameters includes one or more parameters not included in the first set of EIP parameters; and
      reconstructing the current block using the one or more EIP mode parameters.

2. The method of claim 1, wherein the one or more EIP mode parameters comprise a parameter for a reconstruction area for the EIP mode.

3. The method of claim 1, wherein the one or more EIP mode parameters comprise a parameter for a filter shape for the EIP mode.

4. The method of claim 1, further comprising:

parsing, from the video bitstream, an indicator indicating whether the current block of the plurality of blocks is to be decoded using EIP mode.

5. The method of claim 1, wherein the boundary condition involves a picture boundary, a subpicture boundary, a slice boundary, and/or a tile boundary.

6. The method of claim 1, wherein the boundary condition corresponds to the current block being located at a top partition boundary.

7. The method of claim 1, wherein the boundary condition corresponds to the current block being located at a left partition boundary.

8. The method of claim 1, further comprising, when the current block is located at a partition boundary, determining that the EIP mode is inactive for the current block.

9. The method of claim 8, wherein the partition boundary is a top-left partition boundary.

10. The method of claim 1, further comprising, when the EIP mode is active for the current block and when one or more samples in a reconstruction area for the EIP mode are unavailable, padding the one or more samples for the EIP mode.

11. The method of claim 10, wherein padding the one or more samples comprises using a predefined constant value to pad the one or more samples.

12. The method of claim 11, wherein the predefined constant value is based on a sample bit depth.

13. The method of claim 10, wherein padding the one or more samples comprises extending available sample values to pad the one or more samples.

14. The method of claim 1, wherein the first set of EIP parameters includes a first set of reconstruction area types and filter shapes for the EIP mode, the second set of EIP parameters includes a second set of reconstruction area types and filter shapes for the EIP mode, and the first set of reconstruction area types and filter shapes for the EIP mode includes a subset of the second set of reconstruction area types and filter shapes for the EIP mode.

15. A computing system, comprising:

control circuitry;

memory; and one or more sets of instructions stored in the memory and configured for execution by the control circuitry, the one or more sets of instructions causing the control circuitry to perform:

receiving video data that includes a plurality of video blocks; and when an extrapolation filter-based intra prediction (EIP) mode is active for a current block of the plurality of video blocks:

when a boundary condition is met for the current block, determining one or more EIP mode parameters from a first set of EIP parameters, the boundary condition corresponding to at least one of:

a first number of available top rows of reconstruction samples being less than a first threshold, or a second number of available left columns of reconstruction samples being less than a second threshold;

when the boundary condition is not met for the current block, determining the one or more EIP mode parameters from a second set of EIP parameters, wherein the second set of EIP parameters includes one or more parameters not included in the first set of EIP parameters; and encoding the current block using the one or more EIP mode parameters.

16. The computing system of claim 15, wherein the one or more sets of instructions further cause the control circuitry to perform:

signaling, via a video bitstream, an indicator indicating whether the current block of the plurality of video blocks is to be decoded using the EIP mode.

17. A non-transitory computer-readable storage medium storing one or more sets of instructions which when executed by processing circuitry cause the processing circuitry to perform a method of encoding a bitstream, the method comprising:

receiving video data that includes a plurality of video blocks; and when an extrapolation filter-based intra prediction (EIP) mode is active for a current block of the plurality of video blocks:

when a boundary condition is met for the current block, determining one or more EIP mode parameters from a first set of EIP parameters, the boundary condition corresponding to at least one of:

a first number of available top rows of reconstruction samples being less than a first threshold, or a second number of available left columns of reconstruction samples being less than a second threshold;

when the boundary condition is not met for the current block, determining the one or more EIP mode parameters from a second set of EIP parameters, wherein the second set of EIP parameters includes one or more parameters not included in the first set of EIP parameters;

encoding, in the bitstream, the current block using the one or more EIP mode parameters; and transmitting the bitstream.

18. The computing system of claim 15, wherein the first set of EIP parameters includes a first set of reconstruction area types and filter shapes for the EIP mode, the second set of EIP parameters includes a second set of reconstruction area types and filter shapes for the EIP mode, and the first set of reconstruction area types and filter shapes for the EIP mode includes a subset of the second set of reconstruction area types and filter shapes for the EIP mode.

19. The non-transitory computer-readable storage medium of claim 17, wherein the bitstream comprises:

an indicator indicating whether the current block of the plurality of blocks is to be decoded using the EIP mode.

20. The non-transitory computer-readable storage medium of claim 17, wherein the first set of EIP parameters includes a first set of reconstruction area types and filter shapes for the EIP mode, the second set of EIP parameters includes a second set of reconstruction area types and filter shapes for the EIP mode, and the first set of reconstruction area types and filter shapes for the EIP mode includes a subset of the second set of reconstruction area types and filter shapes for the EIP mode.

\* \* \* \* \*